(12) United States Patent
Usui et al.

(10) Patent No.: US 11,433,382 B2
(45) Date of Patent: Sep. 6, 2022

(54) HONEYCOMB FILTER AND METHOD FOR MANUFACTURING HONEYCOMB FILTERS

(71) Applicant: IBIDEN CO., LTD., Ogaki (JP)

(72) Inventors: Toyohiro Usui, Ibi-gun (JP); Tatsuhiro Higuchi, Ibi-gun (JP)

(73) Assignee: IBIDEN CO., LTD., Ogaki (JP)

( * ) Notice: Subject to any disclaimer, the term of this patent is extended or adjusted under 35 U.S.C. 154(b) by 3 days.

(21) Appl. No.: 17/009,781

(22) Filed: Sep. 2, 2020

(65) Prior Publication Data
US 2020/0398263 A1 Dec. 24, 2020

Related U.S. Application Data

(63) Continuation of application No. PCT/JP2019/009749, filed on Mar. 11, 2019.

(30) Foreign Application Priority Data

Mar. 13, 2018 (JP) .............................. JP2018-045518

(51) Int. Cl.
*B01D 39/20* (2006.01)
*B01D 46/00* (2022.01)
(Continued)

(52) U.S. Cl.
CPC ........... *B01J 37/0009* (2013.01); *B01J 23/10* (2013.01); *B01J 35/04* (2013.01); *B01J 37/00* (2013.01);
(Continued)

(58) Field of Classification Search
None
See application file for complete search history.

(56) References Cited

U.S. PATENT DOCUMENTS

| 2007/0269352 A1 | 11/2007 | Miyairi et al. |
| 2009/0011919 A1 | 1/2009 | Noguchi et al. |
(Continued)

FOREIGN PATENT DOCUMENTS

| CN | 101400623 | 4/2009 |
| EP | 2174701 | 4/2010 |
(Continued)

OTHER PUBLICATIONS

Susuki et al., machine translation JP 2015-085241 Abstract, Decription and Claims, May 7, 2015 (Year: 2015).*

*Primary Examiner* — Mary I Omori
(74) *Attorney, Agent, or Firm* — Mori & Ward, LLP

(57) ABSTRACT

The honeycomb filter of the present invention includes a honeycomb fired body that includes multiple cells serving as channels of exhaust gas; and porous cell partition walls defining the cells, the cells including exhaust gas introduction cells whose ends on an exhaust gas inlet side are open and whose ends on an exhaust gas outlet side are plugged, and exhaust gas emission cells whose ends on the exhaust gas outlet side are open and whose ends on the exhaust gas inlet side are plugged, wherein the honeycomb fired body contains ceria-zirconia composite oxide particles and alumina particles, when the pore size of the cell partition walls of the honeycomb fired body is measured by mercury porosimetry, and the measurement results are presented as a pore size distribution curve with pore size (μm) on the horizontal axis and log differential pore volume (mL/g) on the vertical axis, the volume of micropores having a pore size of 1 to 100 μm accounts for 80 vol % or more of the total pore volume, and a value obtained by dividing the half width (μm) of the maximum peak in the pore size range of 1 to 100 μm by the mode size (μm) is 0.5 or less.

3 Claims, 2 Drawing Sheets

(51) Int. Cl.
    B01J 37/00      (2006.01)
    B01J 23/10      (2006.01)
    B01J 35/04      (2006.01)
    B01J 37/08      (2006.01)
    C04B 38/00      (2006.01)
    F01N 3/28       (2006.01)
    B01D 53/88      (2006.01)
    B01D 46/24      (2006.01)

(52) U.S. Cl.
    CPC ........... *B01J 37/0018* (2013.01); *B01J 37/08* (2013.01); *C04B 38/0009* (2013.01); *F01N 3/281* (2013.01); *B01D 46/2429* (2013.01); *B01D 46/24491* (2021.08); *B01D 46/24492* (2021.08); *B01D 53/885* (2013.01); *B01D 2255/2092* (2013.01); *B01D 2255/9205* (2013.01)

(56) References Cited

U.S. PATENT DOCUMENTS

| | | |
|---|---|---|
| 2013/0140742 A1 | 6/2013 | Okazaki |
| 2015/0360162 A1 | 12/2015 | Okazaki |
| 2019/0143313 A1 | 5/2019 | Goto et al. |
| 2019/0144342 A1 | 5/2019 | Goto et al. |
| 2019/0388873 A1* | 12/2019 | Goto .................... B01J 35/1066 |

FOREIGN PATENT DOCUMENTS

| | | | |
|---|---|---|---|
| EP | 2383028 B1 * | 7/2015 | ......... B01D 46/2429 |
| JP | 2007-290951 | 11/2007 | |
| JP | 2007-296514 | 11/2007 | |
| JP | 2013-177302 | 9/2013 | |
| JP | 2015085241 A * | 5/2015 | |
| JP | 2016-055233 | 4/2016 | |
| JP | 2017-115786 | 6/2017 | |
| JP | 2018-143955 | 9/2018 | |
| WO | WO 2008/027302 | 3/2008 | |
| WO | WO 2012/023617 | 2/2012 | |
| WO | WO 2015/046012 | 4/2015 | |
| WO | WO 2017/100340 | 6/2017 | |
| WO | WO 2018/012565 | 1/2018 | |
| WO | WO 2018/012566 | 1/2018 | |
| WO | WO-2018164069 A1 * | 9/2018 | ............. F01N 3/035 |

* cited by examiner

Cross-sectional view taken along line A-A

HONEYCOMB FILTER AND METHOD FOR MANUFACTURING HONEYCOMB FILTERS

TECHNICAL FIELD

The present invention relates to a honeycomb filter and a method of producing a honeycomb filter.

BACKGROUND ART

Exhaust gas discharged from internal combustion engines of automobiles and the like contains particulate matter (PM) and harmful gases such as carbon monoxide (CO), nitrogen oxides (NOx), and hydrocarbons (HC). An exhaust gas catalytic converter that decomposes such harmful gases is also referred to as a three-way catalytic converter. A common three-way catalytic converter includes a catalyst layer formed by wash-coating a honeycomb-shaped monolithic substrate made of cordierite or the like with slurry containing noble metal particles having catalytic activity. Such a catalytic converter is arranged in parallel to a honeycomb-shaped filter that removes PM.

Patent Literature 1 discloses a filter that simultaneously removes the harmful gases and PM, wherein components of cell walls include at least one co-catalyst selected from the group consisting of ceria, zirconia, and a ceria-zirconia solid solution, and micropores communicating between adjacent cells pores are formed in the cell walls.

CITATION LIST

Patent Literature

Patent Literature 1: JP 2017-115786 A

SUMMARY OF INVENTION

Technical Problem

Patent Literature 1, however, is silent on a specific method of forming cell pores communicating between adjacent cell pores.

Further, while the exhaust gas filter obtained by the production method described in Patent Literature 1 achieves sufficient exhaust gas conversion performance by the catalyst, there is a demand for a further increase in PM collection efficiency and a further reduction in pressure loss.

The present invention was made to solve the above problem, and aims to provide a honeycomb filter having higher PM collection efficiency and lower pressure loss.

Solution to Problem

The honeycomb filter of the present invention includes a honeycomb fired body that includes multiple cells serving as channels of exhaust gas; and porous cell partition walls defining the cells, the cells including exhaust gas introduction cells whose ends on an exhaust gas inlet side are open and whose ends on an exhaust gas outlet side are plugged, and exhaust gas emission cells whose ends on the exhaust gas outlet side are open and whose ends on the exhaust gas inlet side are plugged. The honeycomb fired body contains ceria-zirconia composite oxide particles and alumina particles. When the pore size of the cell partition walls of the honeycomb fired body is measured by mercury porosimetry, and the measurement results are presented as a pore size distribution curve with pore size (μm) on the horizontal axis and log differential pore volume (mL/g) on the vertical axis, the volume of macropores having a pore size of 1 to 100 μm accounts for 80 vol % or more of the total pore volume, and a value obtained by dividing the half width (μm) of the maximum peak in the pore size range of 1 to 100 μm by the mode size (μm) is 0.5 or less.

In the honeycomb filter, the pores having a pore size less than 1 μm (hereinafter also referred to as "micropores") are derived from gaps between secondary particles of the ceria-zirconia composite oxide particles and the alumina particles constituting the honeycomb fired body. These micropores do not directly contribute to passage of gas through the cell partition walls. In contrast, pores having a pore size of 1 to 100 μm (hereinafter also referred to as "macropores") are mainly formed by a pore-forming material. These pores allow passage of gas and contribute to PM collection.

In the honeycomb filter of the present invention, when the cell partition walls of the honeycomb fired body are measured by mercury porosimetry, the volume of the macropores that contribute to PM collection accounts for 80 vol % or more of the total pore volume. Thus, a majority of the pores can be used for passage of gas and PM collection, resulting in higher PM collection efficiency and lower pressure loss.

Further, in the honeycomb filter of the present invention, in the pore size distribution curve measured by the mercury porosimetry (pore size (μm) on the horizontal axis and log differential pore volume (mL/g) on the vertical axis), a value obtained by dividing the half width (μm) of the maximum peak in the pore size range of 1 to 100 μm by the mode size (pore size at the maximum peak) (μm) is 0.5 or less (hereinafter such a value is also referred to as "the degree of sharpness"). In other words, since the macropores have a sharp pore size distribution, exhaust gas tends to flow uniformly in the cell partition walls and the cells. This results in higher PM collection efficiency and lower pressure loss.

In the honeycomb filter of the present invention, preferably, the honeycomb fired body has a porosity of 65 to 85 vol %.

The honeycomb fired body having a porosity of 65 to 85 vol % can achieve both high mechanical strength and exhaust gas conversion performance.

In the honeycomb filter of the present invention, preferably, the alumina particles are θ-phase alumina particles.

When the alumina particles are θ-phase alumina particles, owing to their high heat resistance, the honeycomb structured body carrying a noble metal can exhibit high exhaust gas conversion performance even after long-term use.

In the honeycomb filter of the present invention, preferably, a noble metal is supported on the honeycomb fired body.

The honeycomb fired body carrying a noble metal can be used for exhaust gas conversion.

The method of producing a honeycomb filter of the present invention is a method of producing a honeycomb filter including a honeycomb fired body that includes multiple cells serving as channels of exhaust gas; and porous cell partition walls defining the cells, the cells including exhaust gas introduction cells whose ends on an exhaust gas inlet side are open and whose ends on an exhaust gas outlet side are plugged, and exhaust gas emission cells whose ends on the exhaust gas outlet side are open and whose ends on the exhaust gas inlet side are plugged, the method including: a molding step of molding a raw material paste containing ceria-zirconia composite oxide particles, alumina particles, and a spherical pore-forming material into a honeycomb molded body in which multiple cells are arranged longitudinally in parallel with one another with a cell partition wall therebetween; a drying step of drying the honeycomb molded body obtained in the molding step; and a firing step of firing the honeycomb molded body dried in the drying step into a honeycomb fired body, wherein the spherical pore-forming material used in preparation of the raw material paste has a D50 in a volume cumulative particle size distribution curve of 10 to 60 μm and (D90−D10)/(D50) of 1.5 or less, and the dry volume of the spherical pore-forming material accounts for 45 to 70 vol % of the dry volume of the raw material paste.

In the method of producing a honeycomb filter of the present invention, the spherical pore-forming material used in preparation of the raw material paste has a D50 in a volume cumulative particle size distribution curve (hereinafter also simply referred to as "D50") of 10 to 60 μm and (D90−D10)/(D50) of 1.5 or less, and the dry volume of the spherical pore-forming material accounts for 45 to 70 vol % of the dry volume of the raw material paste. Since the granular pore-forming material used in preparation of the raw material paste has a narrow particle diameter distribution, the resulting honeycomb fired body also has a narrow pore size distribution. Further, the dry volume of the spherical pore-forming material is set to account for 45 to 70 vol % of the dry volume of the raw material paste. Thus, the honeycomb filter of the present invention can be obtained.

The dry volume of the raw material paste is the total volume of components (excluding water) of the raw material paste in a dry state with no water content. The volumes of components that are added in the form of aqueous solutions are the volumes of these components in a solid state with no water content. The volumes of components that are added in the form of liquids (excluding aqueous solutions) are the volumes of these components with no water content of the liquids.

In the method of producing a honeycomb filter of the present invention, preferably, the weight ratio of the ceria-zirconia composite oxide particles to the alumina particles (ceria-zirconia composite oxide particles/alumina particles) used in preparation of the raw material paste is 1.0 to 3.0.

The ceria-zirconia composite oxide particle content is high when the weight ratio (ceria-zirconia composite oxide particles/alumina particles) is 1.0 to 3.0, and the ceria-zirconia composite oxide particles are used as co-catalysts, thus improving the exhaust gas conversion performance.

Preferably, the method of producing a honeycomb filter of the present invention further includes a supporting step of allowing a noble metal to be supported on the honeycomb fired body.

The honeycomb fired body carrying a noble metal can be used for exhaust gas conversion.

DESCRIPTION OF EMBODIMENTS

Honeycomb Filter

First, a honeycomb filter of the present invention is described.

The honeycomb filter of the present invention includes a honeycomb fired body that includes multiple cells serving as channels of exhaust gas; and porous cell partition walls defining the cells, the cells including exhaust gas introduction cells whose ends on an exhaust gas inlet side are open and whose ends on, an exhaust gas outlet side are plugged, and exhaust gas emission cells whose ends on the exhaust gas outlet side are open and whose ends on the exhaust gas inlet side are plugged.

In the honeycomb fired body, the multiple cells are arranged in parallel with one another with a cell partition wall therebetween in the longitudinal direction of the honeycomb fired body.

In the honeycomb filter of the present invention, the honeycomb fired body contains ceria-zirconia composite oxide particles (hereinafter referred to as "CZ particles") and alumina particles.

As described later, the honeycomb fired body is produced by extrusion-molding a raw material paste containing the CZ particles, the alumina particles, and an inorganic binder into an extrudate, and firing the extrudate.

Whether or not the honeycomb filter of the present invention contains the above-described components can be confirmed by X-ray diffraction (XRD).

The honeycomb filter of the present invention may include a single honeycomb fired body or multiple honeycomb fired bodies. The multiple honeycomb fired bodies may be combined together with an adhesive therebetween.

In the honeycomb filter of the present invention, a peripheral coat layer may be formed on the outer periphery of the honeycomb fired body.

Figure 1A:
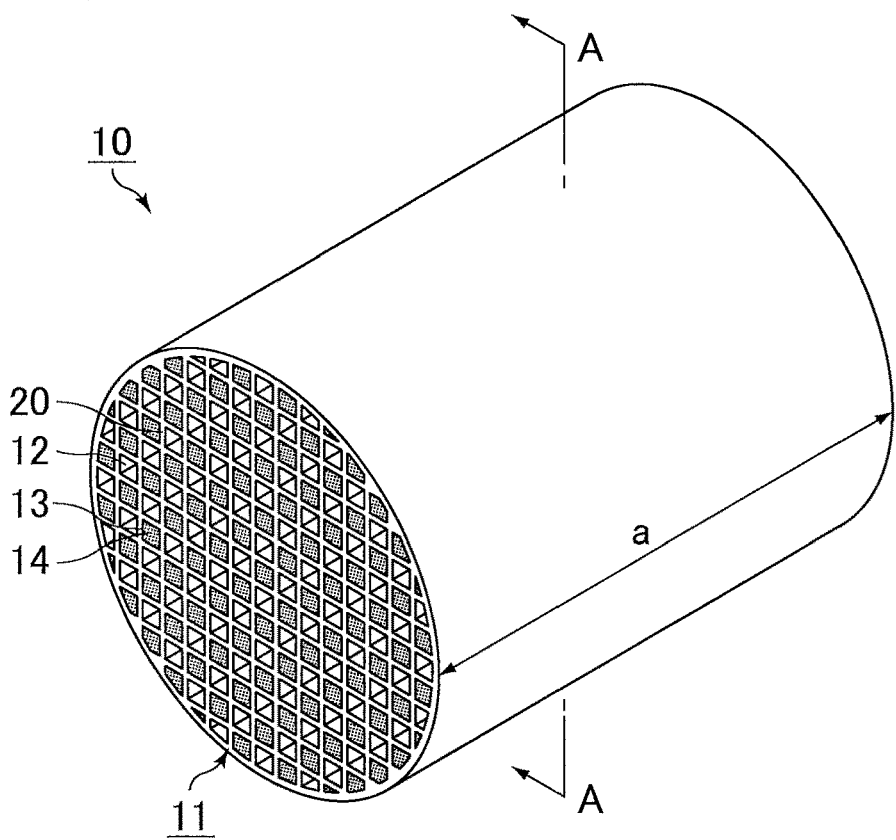
FIG. 1A is a perspective view schematically showing an example honeycomb filter of the present invention.
Figure 1B:
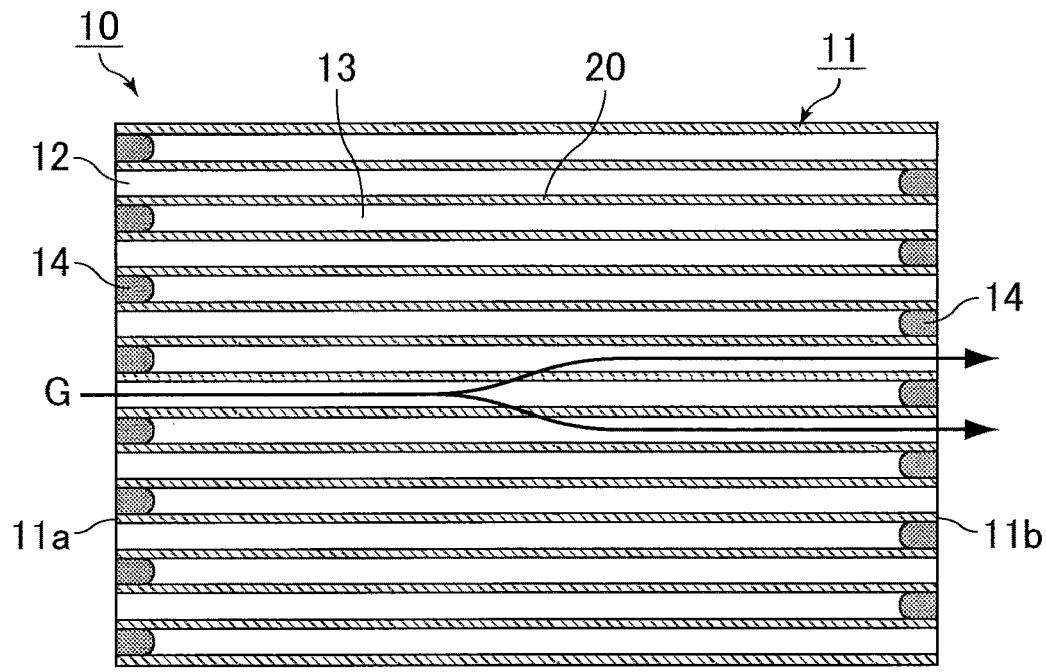
FIG. 1B is a cross-sectional view taken along the line A-A in FIG. 1A.

FIG. 1A is a perspective view schematically showing an example honeycomb filter of the present invention. FIG. 1B is a cross-sectional view taken along the line A-A in FIG. 1A.

A honeycomb filter 10 shown in FIG. 1A and FIG. 1B includes a single honeycomb fired body 11 that includes multiple cells 12 and 13 that serve as channels of exhaust gas; and porous cell partition walls 20 defining the cells 12 and 13, the cells 12 and 13 including exhaust gas introduction cells 12 whose ends 11a on an exhaust gas inlet side are open and whose ends 11b on an exhaust gas outlet side are plugged with a plug 14, and exhaust gas emission cells 13 whose ends 11b on the exhaust gas outlet side are open and whose ends 11a on the exhaust gas inlet side are plugged with the plug 14.

The gas introduction cells 12 and the exhaust gas emission cells 13 are arranged in parallel with one another with a cell partition wall 20 therebetween in a longitudinal direction (a direction indicated by the double-headed arrow "a" in FIG. 1A) of the honeycomb fired body.

As shown in FIG. 1B, exhaust gas (indicated by the arrow G in FIG. 1B) enters the gas introduction cells 12 whose ends 11a on the exhaust gas inlet side are open, passes through the cell partition walls 20, and is discharged from the exhaust gas emission cells 13 whose ends 11b on the exhaust gas outlet side are open.

As shown in FIG. 1A and FIG. 1B, when the honeycomb filter 10 includes the single honeycomb fired body 11, the honeycomb fired body 11 is the honeycomb filter itself.

In the honeycomb filter of the present invention, when the pore size of the cell partition walls of the honeycomb fired body is measured by mercury porosimetry, and the measurement results are presented as a pore size distribution curve with pore size (μm) on the horizontal axis and log differential pore volume (mL/g) on the vertical axis, the volume of macropores having a pore size of 1 to 100 μm accounts for 80 vol % or more of the total pore volume, and a value obtained by dividing the half width (μm) of the maximum peak in the pore size range of 1 to 100 μm by the mode size (μm) is 0.5 or less.

When the volume of macropores having a pore size of 1 to 100 μm accounts for 80 vol % or more of the total pore volume, a majority of the pores can be used for passage of gas and PM collection. This results in higher PM collection efficiency and lower pressure loss.

Further, when a value obtained by dividing the half width (μm) of the maximum peak in the pore size range of 1 to 100 μm by the mode size (μm) is 0.5 or less, the macropores have a sharp pore size distribution, so that exhaust gas tends to flow uniformly in the cell partition walls and the cells.

The total pore volume is the total volume of the pores measured by mercury porosimetry.

The specific measurement procedure of mercury porosimetry is as follows: the honeycomb fired body is cut into a cube with a side of about 0.8 cm, and the cube is ultrasonically washed with ion-exchanged water and sufficiently dried to obtain a measurement sample. The pore size of the measurement sample is measured by mercury porosimetry (in accordance with JIS R 1655: 2003). Specifically, the pore size of the obtained sample is measured using an automated porosimeter "Micromeritics AutoPore III 9405" available from Shimadzu Corporation, for example. The measurement range is 0.006 to 500 μm. The porosity is measured at every pressure increment of 0.1 psia for the range of 100 to 500 μm, and at every pressure increment of 0.25 psia for the range of 0.006 to 100 μm. Here, the porosity is measured with a contact angle of 130° and a surface tension of 485 mN/m.

When the pore size of the cell partition walls of the honeycomb fired body is measured by the mercury porosimetry, and the measurement results are presented as a pore size distribution curve with pore size (μm) on the horizontal axis and log differential pore volume (mL/g) on the vertical axis, the half width (μm) of the maximum peak in the pore size range of 1 to 100 μm is preferably 5 μm or less. The mode size is preferably 5 to 30 μm.

In the honeycomb filter of the present invention, preferably, the honeycomb fired body has a porosity of 65 to 85 vol %.

When the honeycomb fired body has a porosity of 65 to 85 vol %, the resulting honeycomb filter can achieve both high mechanical strength and exhaust gas conversion performance.

When the honeycomb fired body has a porosity lower than 65 vol %, the percentage of pores capable of contributing to passage of gas is low in the cell partition walls of the honeycomb fired body, which may result in higher pressure loss. In contrast, when the honeycomb fired body has a porosity higher than 85%, the porosity is so high that the honeycomb filter has poor mechanical characteristics and is susceptible to problems such as cracks and breakage during use.

In the honeycomb filter of the present invention, preferably, the CZ particles constituting the honeycomb fired body have a D50 of 1 to 10 μm.

The average particle sizes of the CZ particles and the alumina particles constituting the honeycomb fired body can be determined by taking a SEM image of the honeycomb fired body with a scanning electron microscope (SEM "S-4800" available from Hitachi High-Technologies Corporation).

Preferably, the alumina particles constituting the honeycomb filter of the present invention are θ-phase alumina particles.

When the alumina particles are θ-phase alumina particles, owing to their high heat resistance, the honeycomb filter carrying a noble metal can exhibit excellent exhaust gas conversion performance even after long-term use.

In the honeycomb filter of the present invention, preferably, the alumina particle content is 15 to 35 wt %.

In the honeycomb filter of the present invention, preferably, the CZ particle content is 35 to 65 wt %.

Preferably, the honeycomb filter of the present invention contains γ-alumina used as a binder during production. Preferably, the honeycomb filter further contains alumina fibers.

A binder is required during production of the honeycomb filter. When the binder is boehmite, a large part thereof is turned into γ-alumina by firing. When the alumina fibers are contained, these alumina fibers can improve the mechanical characteristics of the honeycomb filter.

The binder content is preferably 0.1 to 10 wt %, and the alumina fiber content is preferably 10 to 40 wt %.

The shape of the honeycomb filter of the present invention is not limited to a round pillar shape. Examples of the shape include a rectangular pillar shape, a cylindroid shape, an oblong pillar shape, and a rectangular pillar shape with rounded corners (e.g., a triangular pillar shape with rounded corners).

In the honeycomb filter of the present invention, the shape of the cells of the honeycomb fired body is not limited to a quadrangular pillar shape. For example, it may be a triangular pillar shape or a hexagonal pillar shape.

In the honeycomb filter of the present invention, the density of the cells in a cross section perpendicular to the longitudinal direction of the honeycomb fired body is preferably 31 to 155 pcs/cm$^2$.

In the honeycomb filter of the present invention, the thickness of the cell partition wall of the honeycomb fired body is preferably 0.05 to 0.50 mm, more preferably 0.10 to 0.30 mm.

In the honeycomb filter of the present invention, when a peripheral coat layer is formed on the outer periphery of the honeycomb fired body, the thickness of the peripheral coat layer is preferably 0.1 to 2.0 mm.

The honeycomb filter of the present invention may include a single honeycomb fired body or multiple honeycomb fired bodies. The multiple honeycomb fired bodies may be combined together with an adhesive therebetween.

In the honeycomb filter of the present invention, a noble metal is preferably supported on the honeycomb fired body.

The honeycomb filter in which a noble metal that functions as a catalyst is supported on the honeycomb fired body can also be used as a honeycomb catalytic converter for exhaust gas conversion.

Examples of the noble metal include platinum, palladium, and rhodium.

In the honeycomb filter of the present invention, the amount of the noble metal supported is preferably 0.1 to 15 g/L, more preferably 0.5 to 10 g/L.

The term "amount of the noble metal supported" as used herein refers to the weight of the noble metal per apparent volume of the honeycomb filter. The apparent volume of the honeycomb filter includes the pore volumes, and it includes the volume of the peripheral coat layer and/or the volume of an adhesive layer.

Method of Producing Honeycomb Filter

Next, the method of producing a honeycomb filter of the present invention is described.

The method of producing a honeycomb filter of the present invention produces a honeycomb filter including a honeycomb fired body that includes multiple cells serving as channels of exhaust gas; and porous cell partition walls defining the cells, the cells including exhaust gas introduction cells whose ends on an exhaust gas inlet side are open and whose ends on an exhaust gas outlet side are plugged, and exhaust gas emission cells whose ends on the exhaust gas outlet side are open and whose ends on the exhaust gas inlet side are plugged, the method including: a molding step of molding a raw material paste containing ceria-zirconia composite oxide particles, alumina particles, and a spherical pore-forming material into a honeycomb molded body in which multiple cells are arranged longitudinally in parallel with one another with a cell partition wall therebetween; a drying step of drying the honeycomb molded body obtained in the molding step; and a firing step of firing the honeycomb molded body dried in the drying step into a honeycomb fired body, wherein the spherical pore-forming material used in preparation of the raw material paste has a D50 in a volume cumulative particle size distribution curve of 10 to 60 μm and (D90−D10)/(D50) of 1.5 or less, and the dry volume of the spherical pore-forming material accounts for 45 to 70 vol % of the dry volume of the raw material paste.

Molding Step

In the molding step, a raw material paste containing ceria-zirconia composite oxide particles, alumina particles, and a spherical pore-forming material is molded into a honeycomb molded body in which multiples cells are arranged longitudinally in parallel with one another with a cell partition wall therebetween.

In the molding step, first, a raw material paste containing CZ particles, alumina particles, and a spherical pore-forming material is prepared.

The spherical pore-forming material used in preparation of the raw material paste has a D50 in a volume cumulative particle size distribution curve of 10 to 60 μm, and (D90−D10)/(D50) of 1.5 or less.

Further, the dry volume of the spherical pore-forming material accounts for 45 to 70 vol % of the dry volume of the raw material paste.

When the spherical pore-forming material used in preparation of the raw material paste has a D50 and (D90−D10)/(D50) in the above ranges, the granular pore-forming material used in preparation of the raw material paste has a narrow particle diameter distribution. Thus, the resulting honeycomb fired body also has a narrow pore size distribution. Further, the dry volume of the spherical pore-forming material is set to account for 45 to 70 vol % of the dry volume of the raw material paste. Thus, the honeycomb filter of the present invention having a porosity of 65 to 85 vol % can be obtained.

Use of alumina particles having a D50 of 1 to 30 μm is preferred.

Use of CZ particles having a D50 of 1 to 10 μm is preferred.

Further, the D50 of the alumina particles to be used is preferably larger than the D50 of the CZ particles.

The weight ratio of the ceria-zirconia composite oxide particles to the alumina particles (ceria-zirconia composite oxide particles/alumina particles) used in preparation of the raw material paste is preferably 1.0 to 3.0.

The ceria-zirconia composite oxide particle content is high when the weight ratio (ceria-zirconia composite oxide particles/alumina particles) is 1.0 to 3.0, and the ceria-zirconia composite oxide particles are used as co-catalysts, thus improving the exhaust gas conversion performance.

The D50 of the alumina particles, the D50 of the CZ particles, and the D10, D50, and D90 of the spherical pore-forming material can be measured using a laser diffraction particle size distribution meter (Mastersizer 2000 available from Malvern Panalytical).

Here, the D10 is a particle size at which the cumulative volume from the smallest particle size is 10% in a volume cumulative particle size distribution curve; the D50 is a particle size at which the cumulative volume from the smallest particle size is 50% in a volume cumulative particle size distribution curve; and the D90 is a particle size at which the cumulative volume from the smallest particle size is 90% in a volume cumulative particle size distribution curve.

The alumina particles used in preparation of the raw material paste are preferably θ-phase alumina particles.

The spherical pore-forming material has a D50 of 10 to 60 μm and (D90−D10)/(D50) of 1.5 or less. Examples of the pore-forming agent that satisfies these conditions include acrylic resins, starch, and carbon. Acrylic resin is preferred among these.

The D50 of the spherical pore-forming material is not limited as long as it is 10 to 60 μm, but it is preferably 15 to 50 μm, more preferably 20 to 40 μm.

The spherical pore-forming material refers to one having an aspect ratio of 3 or less among those used to form pores in the fired body during production of the honeycomb fired body.

The aspect ratio of the spherical pore-forming material can be measured by taking a SEM image of the spherical pore-forming material with a scanning electron microscope (SEM, S-4800 available from Hitachi High-Tech Corporation).

Examples of other raw materials used in preparation of the raw material paste include inorganic fibers, inorganic binders, organic binders, forming auxiliaries, and dispersion media.

Any material may be used for the inorganic fibers. Examples include alumina, silica, silicon carbide, silica alumina, glass, potassium titanate, and aluminum borate. Two or more of these may be used in combination. Alumina fibers are preferred among these.

The inorganic fibers preferably have an aspect ratio of 5 to 300, more preferably 10 to 200, still more preferably 10 to 100.

Any inorganic binder may be used. Examples include solids contained in materials such as alumina sol, silica sol, titania sol, sodium silicate, sepiolite, attapulgite, and boehmite. Two or more of these inorganic binders may be used in combination. Boehmite is preferred among these.

Boehmite is alumina monohydrate with the composition AlOOH, and has good dispersibility in media such as water. Thus, in the method of producing a honeycomb filter of the present invention, boehmite is preferably used as the binder.

Any organic binder may be used. Examples include methyl cellulose, carboxymethyl cellulose, hydroxyethyl cellulose, polyethylene glycol, phenolic resin, and epoxy resin. Two or more of these may be used in combination.

Any dispersion medium may be used. Examples include water and organic solvents such as benzene and alcohols such as methanol. Two or more of these may be used in combination.

Any forming auxiliary may be used. Examples include ethylene glycol, dextrins, fatty acids, fatty acid soaps, and polyalcohols. Two or more of these may be used in combination.

When the CZ particles, alumina particles, alumina fibers, and boehmite are used as the materials of the raw material paste, the percentages of these materials relative to the total solids remaining in the raw material paste after the firing step are preferably as follows: CZ particles: 40 to 60% by weight, alumina particles: 15 to 35% by weight, alumina fibers: 10 to 40% by weight, and boehmite: 0.1 to 10% by weight.

The dry volume of the spherical pore-forming material accounts for 45 to 70 vol % of the dry volume of the raw material paste.

The weight ratio of the CZ particles to the alumina particles (CZ particles/alumina particles) used in preparation of the raw material paste is preferably 1.0 to 3.0.

The CZ particle content is high when the weight ratio (CZ particles/alumina particles) is 1.0 to 3.0, and the CZ particles are used as co-catalysts, thus making it possible to enhance the action of a catalyst supported and to further improve the performance of the honeycomb catalytic converter.

Preparation of the raw material paste preferably involves mixing/kneading. A device such as a mixer or an attritor may be used for mixing, and a device such as a kneader may be used for kneading.

In the method of producing a honeycomb filter of the present invention, the raw material paste prepared by the above method is molded into a honeycomb molded body in which multiple cells are arranged longitudinally in parallel with one another with a cell partition wall therebetween. The raw material paste is extrusion-molded to produce a honeycomb molded body.

Specifically, the raw material paste is passed through a die of a specific shape to form a continuous honeycomb molded body having cells of a specific shape, and the continuous honeycomb molded body is cut to a specific length, whereby a honeycomb molded body is obtained.

Drying Step

In the method of producing a honeycomb filter of the present invention, the molded body obtained in the molding step is dried.

Here, preferably, a dryer such as a microwave dryer, a hot-air dryer, a dielectric dryer, a reduced-pressure dryer, a vacuum dryer, or a freeze-dryer is used to dry the honeycomb molded body into a honeycomb dried body.

Herein, the honeycomb molded body before the firing step and the honeycomb dried body are also collectively referred to as a "honeycomb molded body".

Next, the cells defining the honeycomb dried body are each plugged with a predetermined amount of a plug material paste at either end. The cells are plugged by, for example, applying a mask for cell plugging at the ends of the honeycomb molded body (i.e., at cut surfaces obtained by cutting both ends of the honeycomb molded body), placing the plug material paste only in the cells that need to be plugged, and drying the plug material paste. The honeycomb dried body in which the cells are each plugged at one end is produced by the above steps.

The plug material paste may be the raw material paste.

The step of plugging the cells with the plug material paste may be performed after the firing step described below.

Firing Step

In the firing step, the molded body dried in the drying step is fired to produce a honeycomb fired body. In this step, the honeycomb molded body is degreased and fired. Thus, the step can also be referred to as a "degreasing/firing step", but is referred to as a "firing step" for the purpose of convenience.

The temperature in the firing step is preferably 800° C. to 1300° C., more preferably 900° C. to 1200° C. The duration of the firing step is preferably 1 to 24 hours, more preferably 3 to 18 hours.

The atmosphere of the firing step is not particularly limited, but an atmosphere with an oxygen concentration of 1 to 20% is preferred.

The honeycomb filter of the present invention can be produced by the above steps.

Other Steps

The method of producing a honeycomb filter of the present invention may further include a supporting step of allowing a noble metal to be supported on the honeycomb fired body, if necessary.

Examples of the method of allowing a noble metal to be supported on the honeycomb fired body include a method in which the honeycomb fired body or the honeycomb filter is immersed in a solution containing noble metal particles or a noble metal complex, and the honeycomb fired body or the honeycomb filter is then removed and heated.

When the honeycomb filter includes a peripheral coat layer, a noble metal may be supported on the honeycomb fired body before the peripheral coat layer is formed, or a noble metal may be supported on the honeycomb fired body or the honeycomb filter after the peripheral coat layer is formed.

In the method of producing a honeycomb filter of the present invention, the amount of the noble metal supported in the supporting step is preferably 0.1 to 15 g/L, more preferably 0.5 to 10 g/L.

In the case where the method of producing a honeycomb filter of the present invention includes forming a peripheral coat layer on the outer periphery of the honeycomb fired body, the peripheral coat layer can be formed by applying a peripheral coat layer paste to the outer periphery of the honeycomb fired body excluding both end faces thereof, and then solidifying the peripheral coat layer paste by drying. A paste having the same composition as that of the raw material paste can be used as the peripheral coat layer paste.

EXAMPLES

Examples that more specifically disclose the present invention are described below. The present invention is not limited to these examples.

Preparation of Evaluation Sample

Example 1

The following materials were mixed/kneaded to prepare a raw material paste: 16.9 wt % of CZ particles (D50: 2 µm), 8.5 wt % of γ alumina particles (D50: 20 µm), 2.8 wt % of boehmite as an inorganic binder, 10.6 wt % of alumina fibers having an average fiber size of 3 µm and an average fiber length of 100 µm, 3.9 wt % of methyl cellulose as an organic binder, 28.1 wt % of acrylic resin (aspect ratio: 1.0; D10: 17 µm; D50: 32 µm; and D90: 51 µm) as a spherical pore-forming material, 2.9 wt % of polyoxyethylene oleyl ether (surfactant) as a forming auxiliary; and 26.2 wt % of ion-exchanged water. The forming auxiliary has a viscosity at 30° C. of 50 mPa·s. The dry volume of the spherical pore-forming agent accounted for 55.0 vol % of the dry volume of the raw material paste.

The D50 of the alumina particles, the D50 of the CZ particles, and the D10, D50, and D90 of the spherical pore-forming material were measured using a laser diffraction particle size distribution meter (Mastersizer 2000 available from Malvern Panalytical).

Using an extruder, the raw material paste was extrusion-molded to produce a round pillar-shaped honeycomb molded body. Using a reduced-pressure microwave dryer, the honeycomb molded body was dried at an output of 1.74 kW under a reduced pressure of 6.7 kPa for 12 minutes; a plug material paste having the same composition as that of the raw material paste used to produce the honeycomb molded body was placed in predetermined cells defining the honeycomb molded body so that the cells of the honeycomb molded body were each plugged at one end with the plug material paste; and the honeycomb molded body was further dried at 120° C. for 10 minutes under atmospheric pressure, followed by degreasing/firing at 1100° C. for 10 hours. Thus, a honeycomb fired body (honeycomb filter) was produced. The honeycomb fired body had a round pillar shape with a diameter of 103 mm and a length of 80 mm in which the density of the cells was 77.5 pcs/cm$^2$ (500 cpsi) and the thickness of the cell partition wall was 0.127 mm (5 mil).

Comparative Example 1

A honeycomb fired body according to Comparative Example 1 was produced as in Example 1, except that the following materials were mixed/kneaded to prepare the raw material paste: 25.8 wt % of CZ particles (D50: 2 μm), 12.9 wt % of γ alumina particles (D50: 2 μm), 11.0 wt % of boehmite as an inorganic binder, 5.2 wt % of alumina fibers having an average fiber size of 3 μm and an average fiber length of 30 μm, 7.6 wt % of methyl cellulose as an organic binder, 7.1 wt % of acrylic resin (aspect ratio: 1.0; D10: 6.5 μm; D50: 17 μm; and D90: 33 μm) as a spherical pore-forming material, 4.1 wt % of polyoxyethylene oleyl ether (surfactant) as a forming auxiliary, and 26.4 wt % of ion-exchanged water. The dry volume of the spherical pore-forming agent accounted for 15.7 vol % of the dry volume of the raw material paste.

Measurement of Porosity and Pore Size Distribution

For each of the honeycomb filters produced in Example 1 and Comparative Example 1, the pore size distribution curve, porosity, and total pore volume were determined by mercury porosimetry, and the percentage accounted for by the volume of the macropores having a pore size of 0.1 to 100 μm in the total pore volume was calculated.

Figure 2:
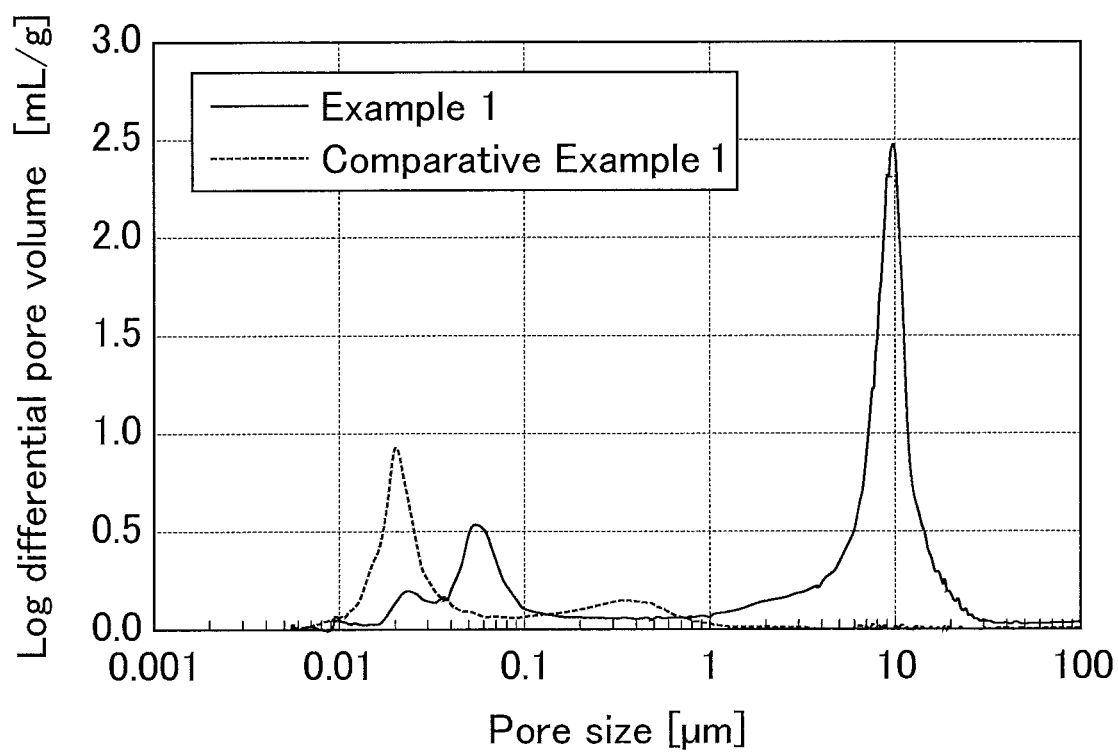
FIG. 2 is a view showing pore size distributions of a honeycomb filter according to an example and a honeycomb filter according to a comparative example.

FIG. 2 shows the measurement results. In the graph shown in FIG. 2, the vertical axis represents the log differential pore volume (mL/g), and the horizontal axis represents the pore size (μm). The solid line shows the result of Example 1, and the dashed line shows the result of Comparative Example 1.

In Example 1, the porosity was 81 vol %; the volume of the macropores having a pore size of 1 to 100 μm accounted for 94 vol % of the total pore volume in the cell partition walls; the half width of the maximum peak was 3.8 μm in the pore size range of 1 to 100 μm; the mode size was 9.8 μm; and the value obtained by dividing the half width of the maximum peak by the mode size was 0.4. In Comparative Example 1, the porosity was 63 vol %; the volume of the macropores having a pore size of 1 to 100 μm accounted for 25 vol % of the total pore volume in the cell partition walls; and no peak was observed in the pore size range of 1 to 100 μm.

FIG. 2 shows that the honeycomb filter according to Example 1 has a sharper pore size distribution of the pores constituting the cell partition walls than the honeycomb filter according to Comparative Example 1.

The honeycomb filter obtained by the method of producing a honeycomb filter of the present invention includes many macropores having a pore size 1 to 100 μm which contribute to passage of gas and PM collection, and the macropores have a sharper pore size distribution. Thus, the honeycomb filter has higher PM collection efficiency and lower pressure loss.

REFERENCE SIGNS LIST 10 honeycomb filter
11 honeycomb fired body
12 gas introduction cell
13 exhaust gas emission cell
14 plug
20 cell partition wall

The invention claimed is:
1. A honeycomb filter comprising:
a honeycomb fired body that includes multiple cells serving as channels of an exhaust gas; and
porous cell partition walls defining the multiple cells, the multiple cells including exhaust gas introduction cells whose ends on an exhaust gas inlet side are open and whose ends on an exhaust gas outlet side are plugged, and exhaust gas emission cells whose ends on the exhaust gas outlet side are open and whose ends on the exhaust gas inlet side are plugged,
wherein the honeycomb fired body contains ceria-zirconia composite oxide particles and alumina particles,
when a pore size of the porous cell partition walls of the honeycomb fired body is measured by mercury porosimetry, and the measurement results are presented as a pore size distribution curve with pore size (μm) on the horizontal axis and log differential pore volume (mL/g) on the vertical axis,
a volume of macropores having a pore size of 1 to 100 μm accounts for 80 vol % or more of a total pore volume, and
a value obtained by dividing a half width (μm) of a maximum peak in the pore size range of 1 to 100 μm by a mode size (μm) is 0.5 or less, and
wherein the honeycomb fired body has a porosity of 65 to 85 vol %.
2. The honeycomb filter according to claim 1,
wherein the alumina particles are θ-phase alumina particles.
3. The honeycomb filter according to claim 1,
wherein a noble metal is supported on the honeycomb fired body.

* * * * *